United States Patent [19]
Körfgen et al.

[11] Patent Number: 5,704,588
[45] Date of Patent: Jan. 6, 1998

[54] DISK-TYPE CUTOFF AND FLOW CONTROL VALVE

[75] Inventors: Harald Körfgen, Hemer; Werner Gnauert, Iserlohn, both of Germany

[73] Assignee: Friedrich Grohe AG, Hemer, Germany

[21] Appl. No.: 709,039

[22] Filed: Sep. 6, 1996

[30] Foreign Application Priority Data

Sep. 20, 1995 [DE] Germany ............... 195 34 849.4

[51] Int. Cl.[6] .................................................. F16K 5/10
[52] U.S. Cl. ............................................................ 251/208
[58] Field of Search ................................. 251/208, 205; 137/454.5, 454.2

[56] References Cited

U.S. PATENT DOCUMENTS

| | | |
|---|---|---|
| 4,501,408 | 2/1985 | Pawelzik . |
| 4,823,832 | 4/1989 | Rodstein .................. 137/454.5 |
| 5,088,688 | 2/1992 | Knapp .................. 137/454.5 X |
| 5,348,042 | 9/1994 | Wagner et al. .......... 251/208 X |

FOREIGN PATENT DOCUMENTS 0 071 066  2/1983  European Pat. Off. .

*Primary Examiner*—Kevin Lee
*Attorney, Agent, or Firm*—Herbert Dubno; Andrew Wilford

[57] ABSTRACT

A valve assembly has a fixed disk and a movable disk. The fixed valve disk has a flat face centered on an axis and is formed to one side of the axis with an axially throughgoing aperture. The normally rotary movable valve disk has a flat face bearing on the fixed-disk face and formed to one side of the axis with an axially throughgoing aperture. Thus on rotation of the rotary disk about the axis relative to the fixed disk the apertures are moved between an aligned position in which fluid can pass through the apertures and a nonaligned position in which each disk at least partially blocks the aperture of the other disk. One of the disks is formed at the respective face to the other side of the axis with an inwardly open recess positioned so as to be exposed by the aperture of the other disk in the nonaligned position.

7 Claims, 2 Drawing Sheets

5,704,588

DISK-TYPE CUTOFF AND FLOW CONTROL VALVE

SPECIFICATION

1. Field of the Invention

The present invention relates to a valve. More particularly this invention concerns a disk-type cutoff and flow-control valve.

2. Background of the Invention

As described in European patent 0,071,066 and U.S. Pat. No. 4,501,408 of M. Pawelzik a disk-type valve has a normally stationary fixed valve disk having a flat face, centered on an axis, and formed to one side of the axis with an axially throughgoing aperture and a normally rotary or movable valve disk having a flat face bearing on the fixed-disk face and formed to one side of the axis with an axially throughgoing aperture. Thus on rotation of the rotary disk about the axis relative to the fixed disk the apertures are moved between an aligned position in which fluid can pass through the apertures and a nonaligned position in which each disk at least partially blocks the aperture of the other disk.

The faces of the disks are normally coated with a lubricant before the valve is assembled, but with time this lubricant film is lost. Since, however, the valve is traversed by liquid the interface does normally get wetted, as much of the face of the fixed disk is swept by the aperture of the movable disk during each opening/closing operation to renew the lubrication constituted by the water passing through the valve.

Nonetheless at the center of the valve there is none of the self-cleansing action present elsewhere, where the valve faces are exposed through the apertures since at the center the two valve disks remain flatly against each other. Thus in this region deposits and buildup of abrasion with lubrication or gravelling is a severe problem that can lead to malfunction of the valve. Eventually these depositions can lead to pushing-apart of the valve disks with concomitant leakage.

OBJECTS OF THE INVENTION

It is therefore an object of the present invention to provide an improved disk-type valve assembly.

Another object is the provision of such an improved disk-type valve assembly which overcomes the above-given disadvantages, that is which is protected against deposits at the center of the valve disks.

SUMMARY OF THE INVENTION

A valve assembly has according to the invention a fixed disk and a movable disk. The fixed valve disk has a flat face centered on an axis and is formed to one side of the axis with an axially throughgoing aperture. The normally rotary movable valve disk has a flat face bearing on the fixed-disk face and formed to one side of the axis with an axially throughgoing aperture. Thus on rotation of the rotary disk about the axis relative to the fixed disk the apertures are moved between an aligned position in which fluid can pass through the apertures and a nonaligned position in which each disk at least partially blocks the aperture of the other disk. In accordance with the invention one of the disks is formed at the respective face to the other side of the axis with an inwardly open recess positioned so as to be exposed by the aperture of the other disk in the nonaligned position.

Thus as the valve is used this recess is filled with water and, as the valve is turned to the off position this water is carried inward to lubricate and clean the critical central region of the disks. As a result even when the originally applied lubricant wears off, the valve faces will be kept wet to avoid picking up deposits.

According to the invention the recess is blind. Each aperture is generally semicircular and has a generally straight edge offset on the one side of the axis from a respective diameter through the axis. Furthermore each disk has a predetermined diameter and the recess has a diameter equal to about 1/20 of the respective disk diameter. The one disk is formed at the aperture with a bump projecting radially from the respective straight edge. In addition in the aligned position flow passes axially in a predetermined direction through the apertures and the recess is formed in the face directed upstream.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
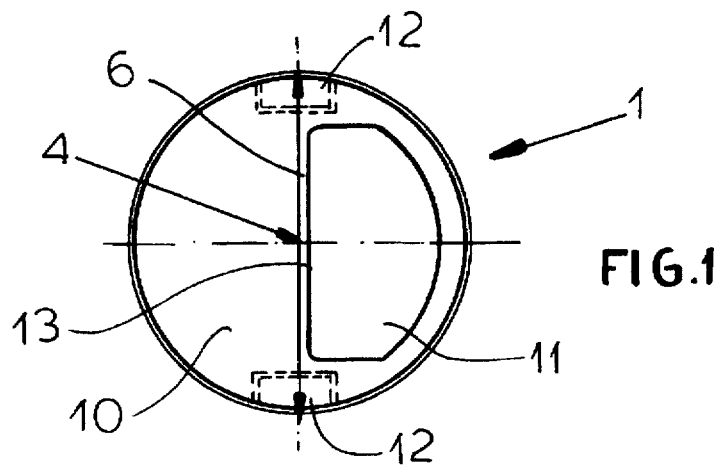
FIGS. 1 and 2 are end views of movable and fixed valve disks according to the invention.

As seen in FIG. 1 a rotary valve disk 1 according to the invention is basically formed as a circular disk of a hard ceramic material with a planar and smooth inner face 10. It is centered on an axis 4 traversed by a diameter 6 and is formed at its outer edge with two axially open and diametrally opposite recesses 12. To one side of the diameter 6 it has a generally semicircular throughgoing aperture or window 11 having an inner edge 13 offset outward from and parallel to the diameter 6.

Figure 2:
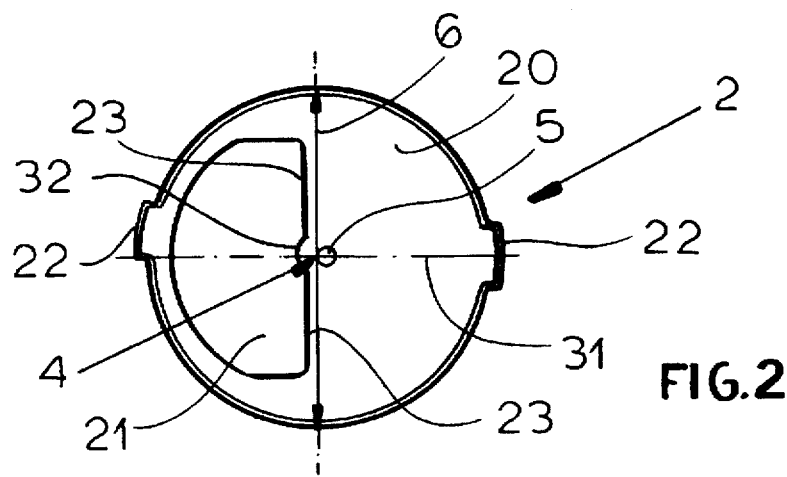

FIG. 2 shows a fixed valve disk 2 also formed of a hard ceramic material with a planar and smooth inner face 20. It is also centered on the axis 4 and is formed on its outer edge with two radially outwardly projecting tabs 22. Like the disk 1 it has to one side of the diameter 6 a generally semicircular throughgoing aperture or window 21 having an inner edge 23 offset outward from and parallel to the diameter 6. In addition the face 20 is formed with a shallow semispherical recess 5 that lies on a diameter 31 perpendicularly intersecting the diameter 6 but offset from the diameter 6 to the opposite side from the window 21. The edge 23 is formed at the diameter 31 with an inward bump 32.

Figure 6:
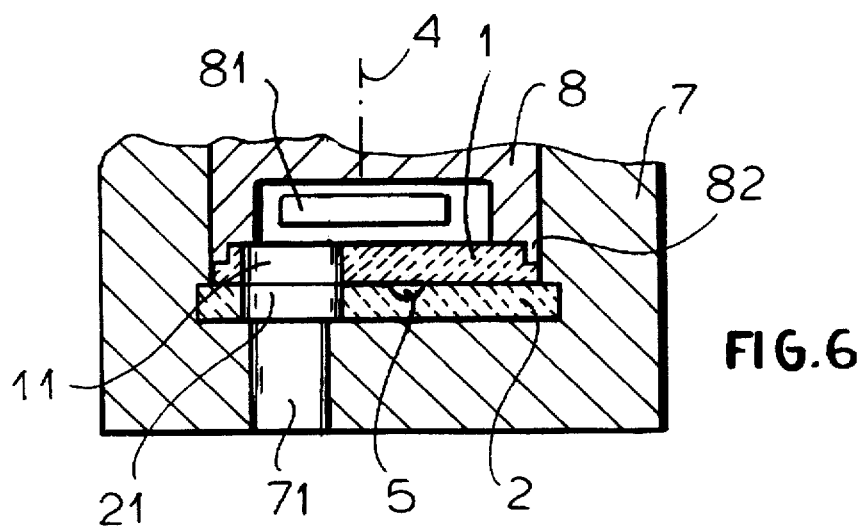
FIG. 6 is a vertical section through a detail of a valve assembly according to the invention.

In use as shown in FIG. 6 the fixed disk 2 is set in a housing 7 that engages around the tabs 22 to lock it in place. The housing 7 is formed with an inlet port 71 that aligns with the aperture 21. A valve body 8 rotatable about the axis 4 in the housing 1 has claws 82 that engage in the cutouts 12 to rotationally couple the disk 1 to the body 8 and is formed with an outlet port 81 aligned with the aperture 11. Thus rotation of the valve body 8 about the axis 4 relative to the housing 7 moves the windows 11 and 21 into and out of axial registration.

Figure 3:
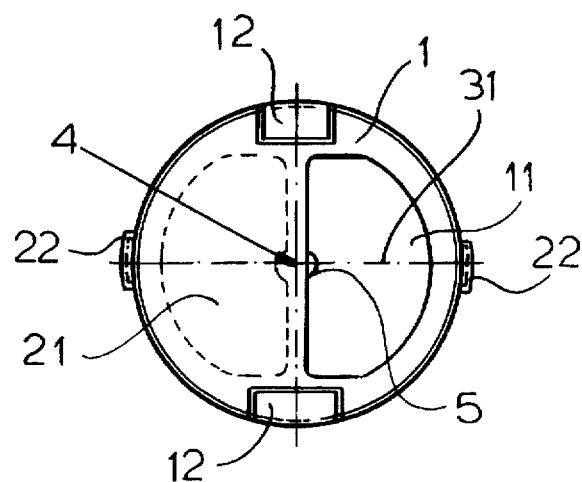
FIGS. 3, 4, and 5 are top views of the valve disks in closed, partially open, and fully open positions, respectively.
Figure 4:
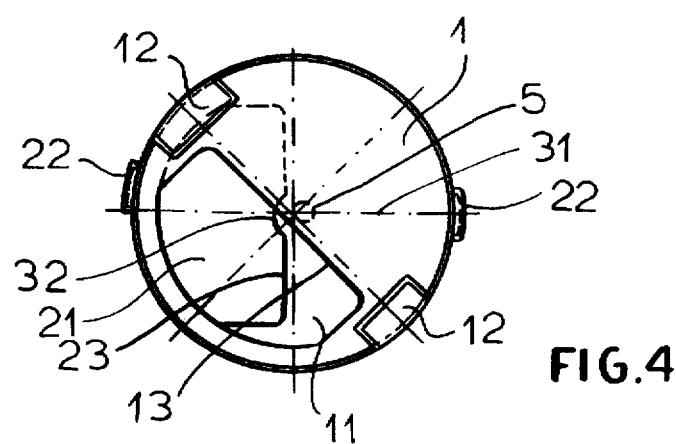
Figure 5:
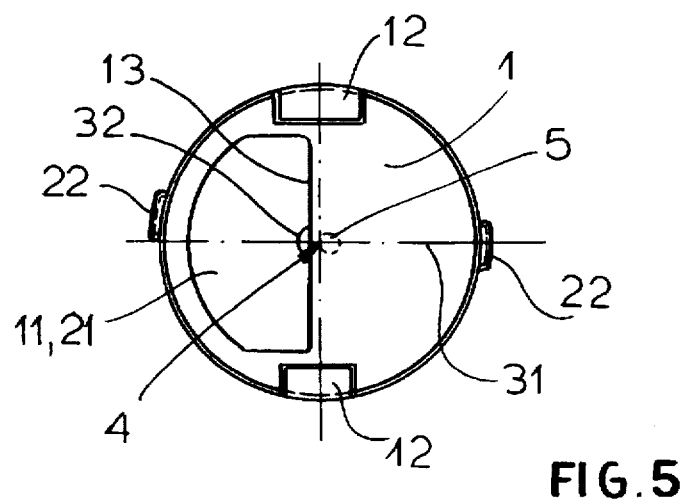

According to the invention as shown in FIG. 3 the recess 5 is positioned so that in the closed position of the valve, that is with the windows 11 and 21 out of alignment with each other and in fact the face 10 wholly blocking the aperture 21, the recess 5 is partially exposed in the aperture 11, to the water normally present here. As the movable disk 1 is rotated through 135° as shown in FIG. 4 to the ¾ open position this recess 5 moves inward, taking with it the clean water it has picked up when open to lubricate the central region of the valve faces 10 and 20. When fully open it moves wholly inward as shown in FIG. 5 to further assist in this lubrication. Thus this critical central region is ensured of regular wetting by the liquid that traverses the valve, reducing the likelihood of deposits at this point.

Of course in a system with several such apertures in each disk there should be several such recesses 5. Such a multi-apertured valve is useful in that it can move from fully open to fully closed with a small angular displacement of the rotary disk.

We claim:

1. A valve assembly comprising:
    a normally stationary fixed valve disk having a flat face, centered on an axis, and formed to one side of the axis with an axially throughgoing aperture; and
    a normally rotary movable valve disk having a flat face bearing on the fixed-disk face and formed to one side of the axis with an axially throughgoing aperture, whereby on rotation of the rotary disk about the axis relative to the fixed disk the apertures are moved between an aligned position in which fluid can pass through the apertures and a nonaligned position in which each disk at least partially blocks the aperture of the other disk, one of the disks being formed at the respective face to the other side of the axis with a recess open axially toward the other disk, offset from the respective aperture, and positioned so as to be exposed by the aperture of the other disk in the nonaligned position and covered by the other disk in the aligned position.

2. The valve assembly defined in claim 1 wherein the recess is blind.

3. The valve assembly defined in claim 1 wherein each aperture is generally semicircular and has a generally straight edge offset on the one side of the axis from a respective diameter through the axis.

4. The valve assembly defined in claim 3 wherein each disk has a predetermined diameter and the recess has a diameter equal to about 1/20 of the respective disk diameter.

5. The valve assembly defined in claim 3 wherein the one disk is formed at the aperture with a bump projecting radially from the respective straight edge.

6. The valve assembly defined in claim 1 wherein in the aligned position flow passes axially in a predetermined direction through the apertures and the recess is formed in the face directed upstream.

7. A valve comprising:
    a housing having an inlet port;
    a valve disk fixed in the housing, having a flat face, centered on the axis, and formed to one side of the axis with an axially throughgoing aperture aligned with the inlet port;
    a valve body rotatable about the axis in the housing and formed with an outlet port; and
    a normally rotary movable valve disk coupled to the body, having a flat face bearing on the fixed-disk face, and formed to one side of the axis with an axially throughgoing aperture aligned with the outlet port, whereby on rotation of the body and rotary disk about the axis relative to the fixed disk and housing the apertures are moved between an aligned position in which fluid can pass through the apertures and a nonaligned position in which each disk at least partially blocks the aperture of the other disk, one of the disks being formed at the respective face to the other side of the axis with a recess open axially toward the other disk, offset from the respective aperture, and positioned so as to be exposed by the aperture of the other disk in the nonaligned position and covered by the other disk in the aligned position.

* * * * *